US012613640B2

(12) United States Patent
Chen et al.

(10) Patent No.: US 12,613,640 B2
(45) Date of Patent: Apr. 28, 2026

(54) MEMORY CONTROLLER AND MEMORY DATA RECEIVING METHOD

(71) Applicant: Realtek Semiconductor Corp., HsinChu (TW)

(72) Inventors: Shih-Chang Chen, HsinChu (TW); Chih-Wei Chang, HsinChu (TW); Chun-Chi Yu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 104 days.

(21) Appl. No.: 18/665,545

(22) Filed: May 15, 2024

(65) Prior Publication Data

US 2024/0402915 A1    Dec. 5, 2024

(30) Foreign Application Priority Data

May 29, 2023    (TW) .................................. 112119865

(51) Int. Cl.
*G06F 3/06* (2006.01)
(52) U.S. Cl.
CPC .......... *G06F 3/0619* (2013.01); *G06F 3/0659* (2013.01); *G06F 3/0673* (2013.01)
(58) Field of Classification Search
CPC ..... G06F 3/0619; G06F 3/0659; G06F 3/0673
USPC ......................................................... 365/194
See application file for complete search history.

(56) References Cited

U.S. PATENT DOCUMENTS

| | | | |
|---|---|---|---|
| 10,916,278 B1 | 2/2021 | Chi et al. | |
| 2019/0079699 A1* | 3/2019 | Lee .......................... | G11C 7/22 |
| 2020/0105323 A1 | 4/2020 | Kim | |
| 2022/0405190 A1 | 12/2022 | Lee | |
| 2024/0321330 A1* | 9/2024 | Kavala ................. | G11C 29/028 |

FOREIGN PATENT DOCUMENTS

TW          202113826 A          4/2021

* cited by examiner

*Primary Examiner* — Ly D Pham
(74) *Attorney, Agent, or Firm* — Winston Hsu

(57) ABSTRACT

A memory controller is arranged to access a memory device, and includes a receiving circuit. The receiving circuit is arranged to receive a data signal and a data strobe signal from the memory device, and includes a sampling circuit and a comparison circuit. The sampling circuit is arranged to sample the data signal or a delayed data signal according to a plurality of delayed versions of the data strobe signal to generate a plurality of sampling values, wherein the delayed data signal is a delayed version of the data signal. The comparison circuit is arranged to compare the plurality of sampling values to obtain a comparison result, and arranged to determine to provide the data signal or the delayed data signal to the sampling circuit according to the comparison result.

14 Claims, 7 Drawing Sheets

100

Figure 5:
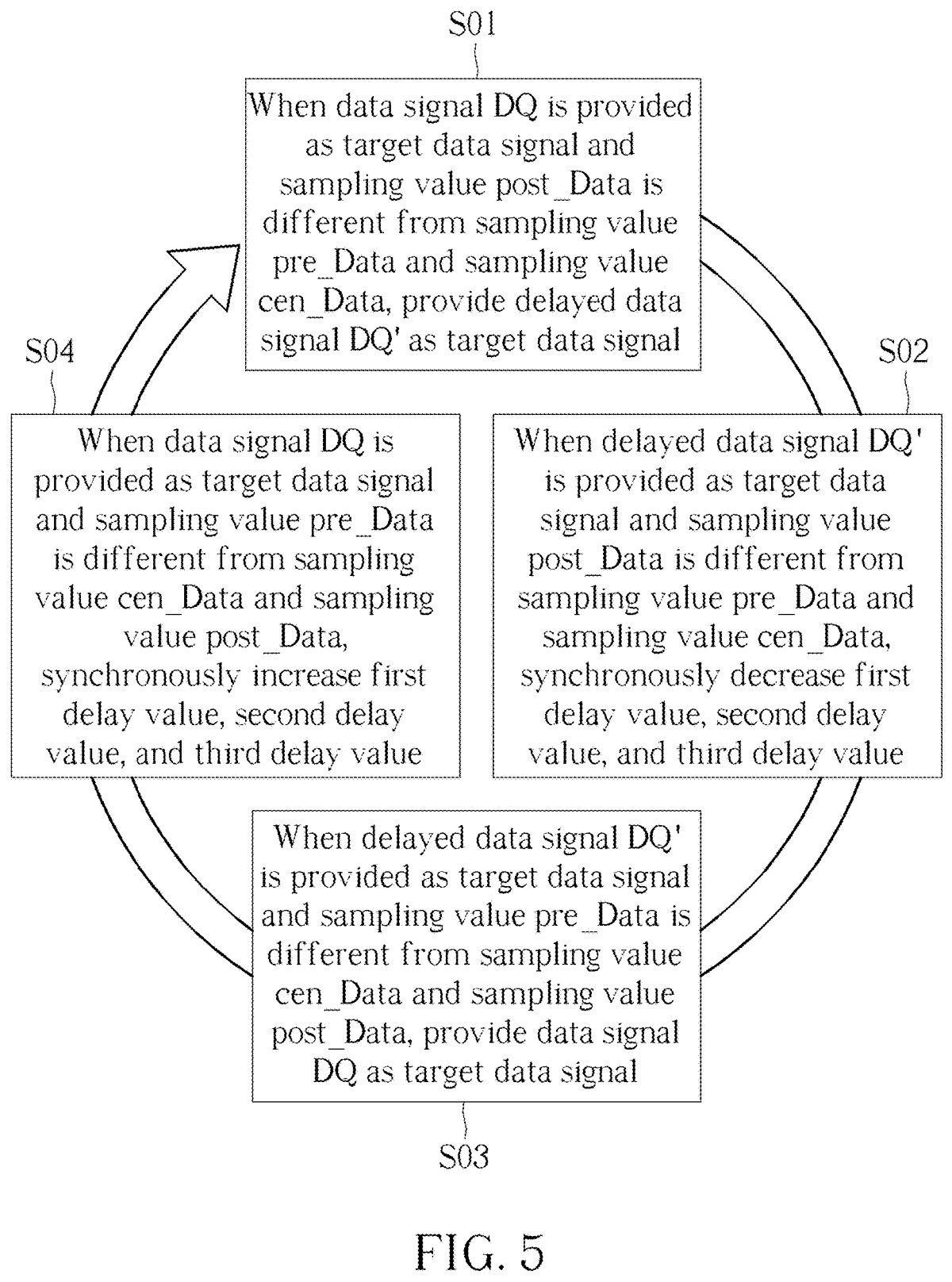

S01

When data signal DQ is provided as target data signal and sampling value post_Data is different from sampling value pre_Data and sampling value cen_Data, provide delayed data signal DQ' as target data signal

S04

When data signal DQ is provided as target data signal and sampling value pre_Data is different from sampling value cen_Data and sampling value post_Data, synchronously increase first delay value, second delay value, and third delay value

S02

When delayed data signal DQ' is provided as target data signal and sampling value post_Data is different from sampling value pre_Data and sampling value cen_Data, synchronously decrease first delay value, second delay value, and third delay value When delayed data signal DQ' is provided as target data signal and sampling value pre_Data is different from sampling value cen_Data and sampling value post_Data, provide data signal DQ as target data signal

MEMORY CONTROLLER AND MEMORY DATA RECEIVING METHOD

BACKGROUND OF THE INVENTION

1. Field of the Invention

The present invention is related to memory control, and more particularly, to a memory controller and an associated memory data receiving method that can expand an effective sampling window by delaying a data signal.

2. Description of the Prior Art

When a memory controller receives a data signal, the data signal is sampled according to a sampling clock signal from a memory device. If the phase of the sampling clock signal is not well selected, erroneous sampling values may be obtained. In addition, as the data rate increases, an effective sampling window for receiving data will shrink accordingly, which may increase the sampling error rate.

SUMMARY OF THE INVENTION

It is therefore one of the objectives of the present invention to provide a memory controller and an associated memory data receiving method that can dynamically adjust a sampling phase of a sampling clock signal according to sampling results for sampling a memory data signal by a suitable sampling phase, and can expand an effective sampling window by delaying a data signal, to address the above-mentioned issues.

According to an embodiment of the present invention, a memory controller is provided, wherein the memory controller is arranged to access a memory device. The memory controller comprises a receiving circuit. The receiving circuit is arranged to receive a data signal and a data strobe signal from the memory device, and comprises a sampling circuit and a comparison circuit. The sampling circuit is arranged to sample the data signal or a delayed data signal according to a plurality of delayed versions of the data strobe signal, to generate a plurality of sampling values, wherein the delayed data signal is a delayed version of the data signal. The comparison circuit is arranged to compare the plurality of sampling values to obtain a comparison result, and arranged to determine to provide the data signal or the delayed data signal to the sampling circuit according to the comparison result.

According to another embodiment of the present invention, a memory data receiving method is provided. The memory data receiving method comprises the following steps: (A) receiving a data signal and a data strobe signal from a memory device; (B) generating a delayed data signal according to a predetermined delay value; (C) selecting the data signal or the delayed data signal as a target data signal, and sampling the target data signal according to a plurality of delayed versions of the data strobe signal to generate a plurality of sampling values; and (D) comparing the plurality of sampling values to obtain a comparison result, and determining to provide the data signal or the delayed data signal as the target data signal according to the comparison result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating a state machine according to an embodiment of the present invention.

DETAILED DESCRIPTION

Figure 1:
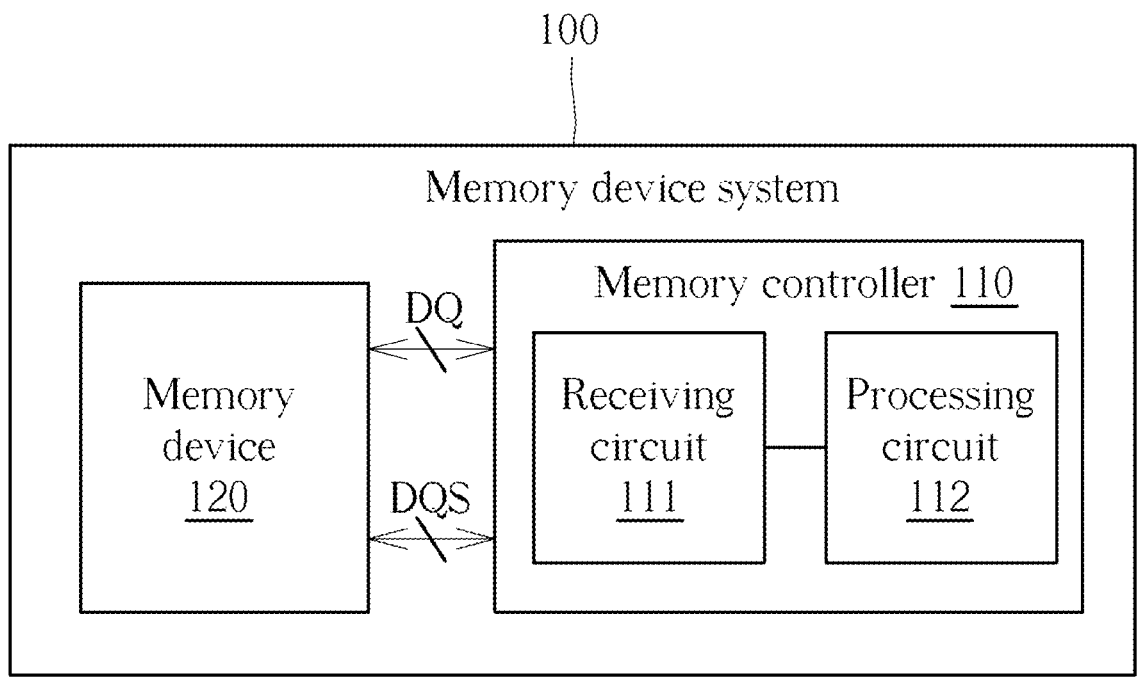
FIG. 1 is a diagram illustrating a memory device system according to an embodiment of the present invention.

FIG. 1 is a diagram illustrating a memory device system 100 according to an embodiment of the present invention, wherein the memory device system 100 may be applicable to a personal computer, a laptop, etc. The memory device system 100 includes a memory controller 110 and a memory device 120 (e.g. a dynamic random access memory (DRAM)). The memory controller 110 is arranged to access the memory device 120. The memory controller 110 is coupled to the memory device 120, and may receive a data signal DQ and a data strobe signal DQS from the memory device 120 when a reading operation is performed. The memory controller 110 may sample the data signal DQ according to the data strobe signal DQS to obtain the data contents. The memory controller 110 may be further coupled to a host (not shown in FIG. 1) for transmitting read data to the host.

The memory controller 110 includes a receiving circuit 111 and a processing circuit 112. The receiving circuit 111 may receive the data signal DQ and the data strobe signal DQS from the memory device 120 through a plurality of receiving pads, and sample the data signal DQ according to the data strobe signal DQS to generate a plurality of sampling values. The processing circuit 112 may receive the sampling values from the receiving circuit 111, and process the sampling values to obtain one or more data bits of the read data. In addition, the memory controller 110 may further include a transmitting circuit (not shown in FIG. 1), wherein the transmitting circuit transmits a control signal and the data signal DQ to the memory device 120 via control of the processing circuit 112, for writing the data into the memory device 120.

As the data rate increases, an effective sampling window for receiving data will shrink accordingly. In addition, in the double data rate (DDR) applications, since a sampling path on a rising edge (or a positive edge) is arranged to sample the data of half a clock cycle, and a sampling path on a falling edge (or a negative edge) is arranged to sample the data of the corresponding other half of the clock cycle, each sampling path actually only has an effective sampling window that is half the length of the clock cycle. In order to address the problem that the effective sampling window is too small, the present invention proposes a memory controller circuit and an associated memory data receiving method that can expand the effective sampling window by delaying the data signal and make an effective sampling range of the data expand automatically. In this way, the memory device system 100 is less susceptible to sampling errors due to noise interference, and stability and noise immunity of the memory device system 100 for receiving data can be greatly improved.

Figure 2:
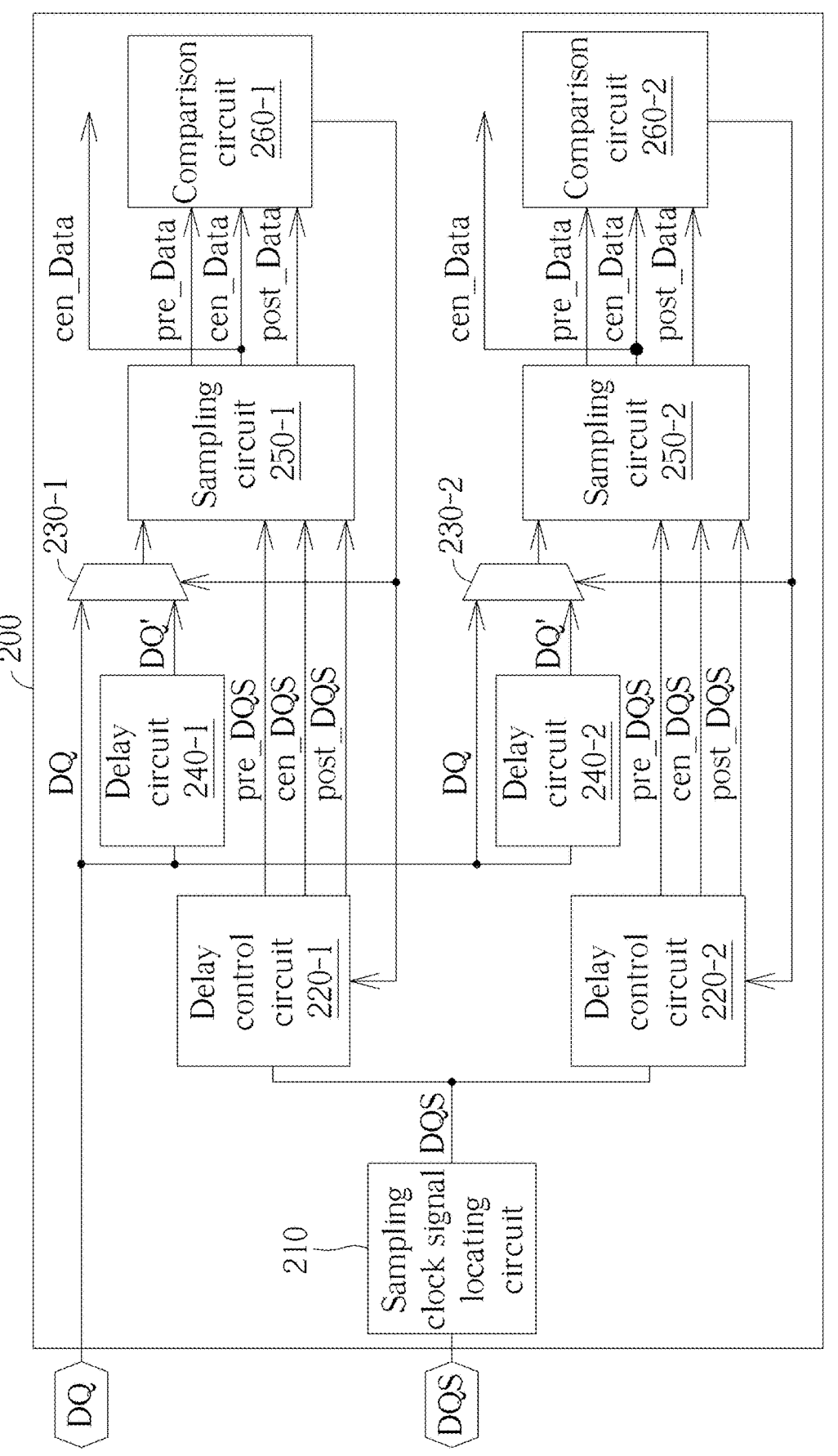
FIG. 2 is a block diagram of a receiving circuit according to an embodiment of the present invention.

FIG. 2 is a block diagram of a receiving circuit 200 according to an embodiment of the present invention. The receiving circuit 200 may receive the data signal DQ and the data strobe signal DQS from the memory device 120 through the receiving pads. The receiving circuit 200 includes a sampling clock signal locating circuit 210, wherein the sampling clock signal locating circuit 210 is arranged to locate a sampling clock signal in the data strobe signal DQS that can be used to sample the data signal DQ. Specifically, before the memory device has output the sampling clock signal, a voltage level of the data strobe signal DQS can be set as tri-state logic different from two logical levels 0 and 1. When the memory device 120 starts to output the sampling clock signal, the memory device 120 may transmit a preamble in the data strobe signal DQS, and then transmit the sampling clock signal. As a result, the sampling clock signal locating circuit 210 may locate the cycle of the first sampling clock signal by identifying a pattern of the preamble transmitted in the data strobe signal DQS. After confirming a pattern of the sampling clock signal transmitted in the data strobe signal DQS, the sampling clock signal locating circuit 210 may provide the data strobe signals DQS to a delay control circuit 220-1 configured on a rising edge sampling path and a delay control circuit 220-2 configured on a falling edge sampling path, respectively. It should be noted that, since the data strobe signal DQS will keep carrying the sampling clock signal provided by the memory device 120, the following paragraphs will use the data strobe signal DQS to represent the sampling clock signal as an illustration.

In an embodiment of the present invention, the delay control circuits 220-1 and 220-2 may delay the data strobe signal DQS according to a plurality of delay values, to generate different delayed versions of the data strobe signal DQS. Specifically, under a condition that the receiving circuit 200 samples the data signal DQ by a delayed data strobe signal delayed by a basic delay value (e.g. a second delay value), the delay control circuits 220-1 and 220-2 may additionally derive a leading delay value (e.g. a first delay value) and a trailing delay value (e.g. a third delay value) according to the basic delay value, and generate a first delayed data strobe signal (e.g. a delayed data strobe signal pre_DQS shown in FIG. 2), a second delayed data strobe signal (a delayed data strobe signal cen_DQS shown in FIG. 2), and a third delayed data strobe signal (a delayed data strobe signal post_DQS shown in FIG. 2) according to the leading delay value, the basic delay value, and the trailing delay value, respectively.

In an embodiment of the present invention, the leading delay value (e.g. the first delay value) may be smaller than the basic delay value (e.g. the second delay value), and the basic delay value (e.g. the second delay value) may be smaller than the trailing delay value (e.g. the third delay value), wherein each delay value may correspond to a sampling phase. As a result, the leading delay value may correspond to a leading sampling phase, the basic delay value may correspond to a central sampling phase, and the trailing delay value may correspond to a trailing sampling phase, wherein the leading sampling phase leads the central sampling phase, and the central sampling phase leads the trailing sampling phase.

The receiving circuit 200 may further include a multiplexer (MUX) 230-1, a delay circuit 240-1, a sampling circuit 250-1, and a comparison circuit 260-1 that are configured on the rising edge sampling path, and further include a MUX 230-2, a delay circuit 240-2, a sampling circuit 250-2, and a comparison circuit 260-2 that are configured on the falling edge sampling path. In response to the comparison results of the comparison circuits 260-1 and 260-2, the MUXs 230-1 and 230-2 may select one of the data signal DQ and a delayed data signal DQ' as a target data signal for being provided to the sampling circuits 250-1 and 250-2, respectively, wherein the delayed data signal DQ' is generated according to a predetermined delay value by the delay circuits 240-1 and 240-2, and the predetermined delay value may be a fixed value, but the present invention is not limited thereto.

The sampling circuits 250-1 and 250-2 may sample the target data signal according to the delayed versions of the data strobe signal DQS (e.g. the first delayed data strobe signal, the second delayed data strobe signal, and the third delayed data strobe signal received from the delay control circuits 220-1 and 220-2) in sequence, to generate a first sampling value (e.g. a sampling value pre_Data shown in FIG. 2), a second sampling value (e.g. a sampling value cen_Data shown in FIG. 2), and a third sampling value (e.g. a sampling value post_Data shown in FIG. 2).

Figure 3:
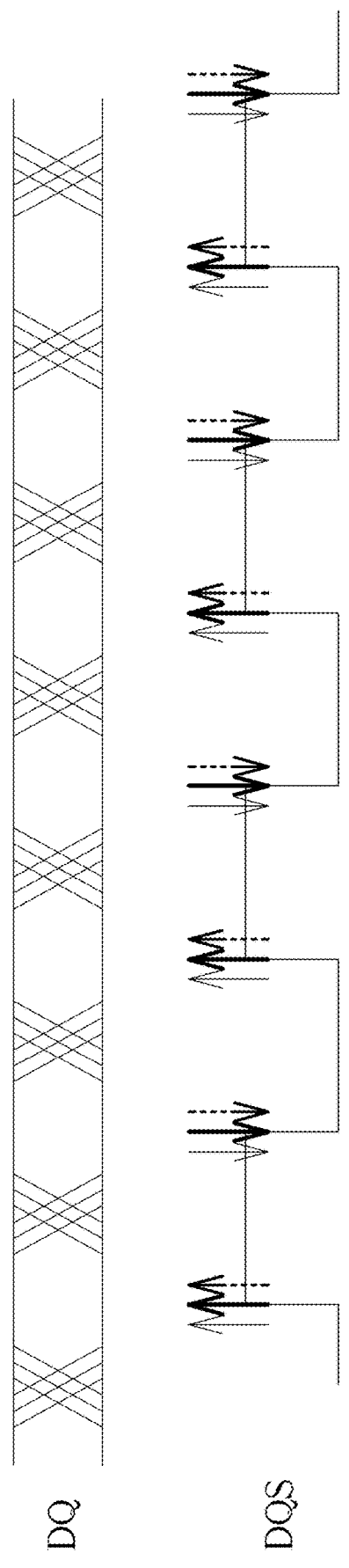
FIG. 3 is a diagram illustrating waveforms of a data signal and a data strobe signal according to an embodiment of the present invention.

FIG. 3 is a diagram illustrating waveforms of the data signal DQ and the data strobe signal DQS according to an embodiment of the present invention. In this embodiment, operations of sampling the data signal DQ by the data strobe signal DQS with different delay values are illustrated. In some embodiments, the waveform of the data signal DQ shown in FIG. 3 may be replaced by that of the delayed data signal DQ', and operations of sampling the delayed data signal DQ' by the data strobe signal DQS with different delay values are illustrated.

In FIG. 3, three arrows are drawn on each rising edge and each falling edge to represent operations of sampling the data signal DQ by three delayed data strobe signals DQS with different delay values, wherein an arrow drawn with a thin solid line represents an operation of sampling the data signal DQ by an edge (e.g. a rising edge or a falling edge) of the first delayed data strobe signal, an arrow drawn with a thick solid line represents an operation of sampling the data signal DQ by an edge (e.g. a rising edge or a falling edge) of the second delayed data strobe signal, an arrow drawn with a dotted line represents an operation of sampling the data signal DQ by an edge (e.g. a rising edge or a falling edge) of the third delayed data strobe signal, and these three operations may generate the first sampling value (e.g. the sampling value pre_Data shown in FIG. 2), the second sampling value (e.g. the sampling value cen_Data shown in FIG. 2), and the third sampling value (e.g. the sampling value post_Data shown in FIG. 2), respectively.

Specifically, during a cycle of a sampling clock signal, the sampling circuits 250-1 and 250-2 may sample the target data signal by a first edge of the first delayed data strobe signal to generate the first sampling value, sample the target data signal by a second edge of the second delayed data strobe signal to generate the second sampling value, and sample the target data signal by a third edge of the third delayed data strobe signal to generate the third sampling value, wherein the first edge, the second edge, and the third edge may be rising edges for the sampling circuit 250-1, and may be falling edges for the sampling circuit 250-2. In this embodiment, the first edge may be an edge closest to one side of the second edge in all edges of the first delayed data strobe signal, and the third edge may be an edge closest to another side of the second edge in all edges of the third delayed data strobe signal.

Refer back to FIG. 2. The comparison circuit 260-1 may be arranged to receive the first sampling value, the second sampling value, and the third sampling value generated on the rising edge sampling path from the sampling circuit 250-1 in sequence. The comparison circuit 260-2 may be arranged to receive the first sampling value, the second sampling value, and the third sampling value generated on the falling edge sampling path from the sampling circuit 250-2 in sequence. Each of the comparison circuits 260-1 and 260-2 may compare the received sampling values to obtain a comparison result.

According to an embodiment of the present invention, the comparison results may be provided to the MUXs 230-1 and 230-2 and the delay control circuits 220-1 and 220-2, respectively. The MUXs 230-1 and 230-2 may select the data signal DQ or the delayed data signal DQ' as the target data signal according to the comparison results, for being provided to the sampling circuits 250-1 and 250-2. The delay control circuits 220-1 and 220-2 may determine whether to adjust the basic delay value according to the comparison results. In this embodiment, the comparison results generated by the comparison circuits 260-1 and 260-2 only include the comparison results of three sampling values.

According to another embodiment of the present invention, the comparison circuits 260-1 and 260-2 may further determine which of the data signal DQ and the delayed data signal DQ' needs to be provided to the sampling circuits 250-1 and 250-2 in the next sampling operation according to current comparison results, and generate corresponding control signals to control selection of the MUXs 230-1 and 230-2, respectively. Similarly, the comparison circuits 260-1 and 260-2 may determine whether to adjust the basic delay value according to the current comparison results, and generate corresponding delay control signals to the delay control circuits 220-1 and 220-2, so that the delay control circuits 220-1 and 220-2 may adjust or control the basic delay value (e.g. the second delay value) according to the corresponding delay control signals.

It should be noted that there is a predetermined relationship between the basic delay value (e.g. the second delay value), the leading delay value (e.g. the first delay value), and the trailing delay value (e.g. the third delay value). As a result, when the basic delay value (e.g. the second delay value) is adjusted, the leading delay value (e.g. the first delay value) and the trailing delay value (e.g. the third delay value) will also be adjusted synchronously and correspondingly. For example, these three delay values are adjusted equally, but the present invention is not limited thereto.

In an embodiment of the present invention, the delay control circuits 220-1 and 220-2 may set a predetermined basic delay value in advance, derive the leading delay value and the trailing delay value according to the predetermined basic delay value, and generate corresponding delayed data strobe signals DQS according to these different delay values. After the sampling circuits 250-1 and 250-2 sample the data signal DQ or the delayed data signal DQ' by the delayed data strobe signals DQS with different delay values to obtain the sampling values pre_Data, cen_Data, and post_Data, the sampling circuits 250-1 and 250-2 may provide the sampling value cen_Data to a post-stage circuit (e.g. the processing circuit 112 shown in FIG. 1). The comparison circuits 260-1 and 260-2 may compare the sampling values pre_Data, cen_Data, and post_Data to generate the comparison results, wherein the comparison results may be used for feedback control of the delay adjustment of the delay control circuits 220-1 and 220-2, and may be used for feedback control of the input selection of the sampling circuits 250-1 and 250-2. By repeated feedback control and adjustment, a sampling phase or a sampling point of the data signal DQ (e.g. a sampling phase or a sampling point corresponding to the basic delay value) can be well controlled within an effective sampling range of the data.

In addition, the data signal DQ may be delayed by the delay circuits 240-1 and 240-2, and the input source (i.e. the target data signal) of the sampling circuits 250-1 and 250-2 may be switched between the data signal DQ and the delayed data signal DQ' flexibly by the MUXs 230-1 and 230-2. In this way, the effective sampling window can be expanded, and the effective sampling range of the data can be automatically expanded.

Figure 4:
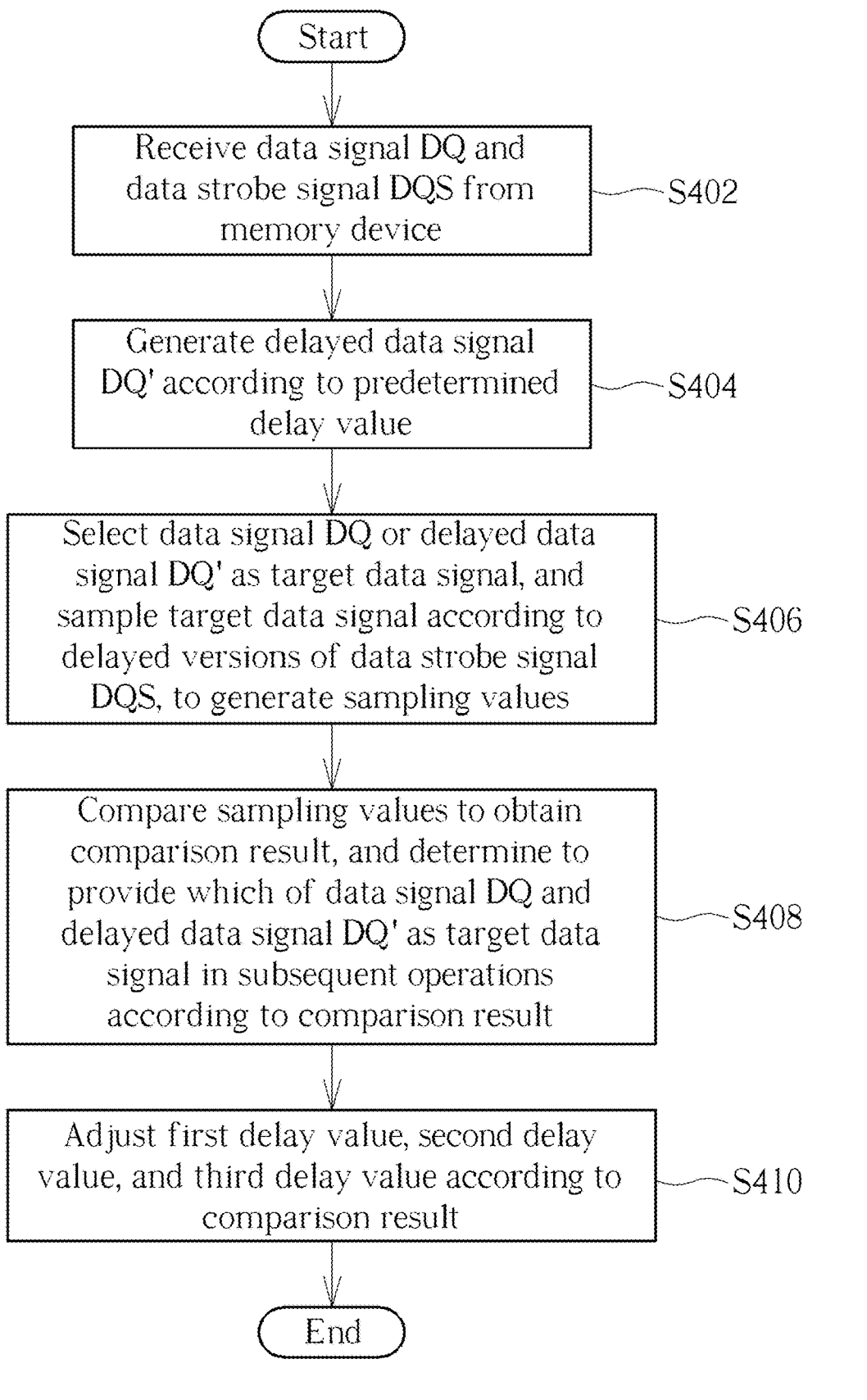
FIG. 4 is a flow chart of a memory data receiving method according to an embodiment of the present invention.

FIG. 4 is a flow chart of a memory data receiving method according to an embodiment of the present invention, and includes the following steps.

In Step S402, the data signal DQ and the data strobe signal DQS are received from the memory device.

In Step S404, the delayed data signal DQ' is generated according to a predetermined delay value. For example, the delay values used by the delay circuits 240-1 and 240-2 are set by the predetermined delay value for generating the delayed data signal DQ'.

In Step S406, the data signal DQ or the delayed data signal DQ' is selected as the target data signal, and the target data signal is sampled according to the delayed versions of the data strobe signal DQS to generate the sampling values. In an embodiment of the present invention, when Step S406 is executed for the first time, the data signal DQ may be directly selected or determined as the target data signal, but the invention is not limited thereto. In addition, before the sampling operations are performed, the delayed versions of the data strobe signal DQS can be generated by the following steps.

In Step S406-1, the first delayed data strobe signal is generated according to the first delay value.

In Step S406-2, the second delayed data strobe signal is generated according to the second delay value.

In Step S406-3, the third delayed data strobe signal is generated according to the third delay value.

In Step S408, the sampling values generated in Step S406 are compared to obtain a comparison result, and based on the comparison result, it is determined which of the data signal DQ and the delayed data signal DQ' should be provided as the target data signal in subsequent operations.

In Step S410, the first delay value, the second delay value, and the third delay value are adjusted according to the comparison result.

In this embodiment, Steps S406, S408, and S410 may be executed repeatedly, and the target data signal determined in Step S408 and the adjustment performed in Step S410 will be applied to the next execution of Step S406.

It should be noted that Step S410 is an optional step. In some embodiments, the adjustment performed in Step S410 may be an adjustment with an adjustment amount of 0 (i.e. no adjustment). In an embodiment of the present invention, it may be selectively determined whether to execute Step S410 (or whether the adjustment amount in Step S410 is 0) based on which data signal is currently selected as the target data signal and based on the relationship of the sampling values generated in Step S406.

FIG. 5 is a diagram illustrating a state machine according to an embodiment of the present invention, wherein the state transition is used to illustrate the feedback control mechanism implemented according to the target data signal and the relationship between the sampling values.

In state S01, when the data signal DQ is provided as the target data signal (i.e. a data signal source of the sampling circuits is switched to a data signal providing path with no delay by the MUXs), and the third sampling value (e.g. the sampling value post_Data) is different from the first sampling value (e.g. the sampling value pre_Data) and the second sampling value (e.g. the sampling value cen_Data), it is determined to provide the delayed data signal DQ' to the sampling circuits 250-1 and 250-2 as the target data signal. It should be noted that, when the third sampling value is different from the first sampling value and the second sampling value, it means that the sampling point (or the central sampling phase) corresponding to the current basic delay value is too close to the trailing edge of the data. The feedback control implemented in the state S01 is used to change the target data signal. Its effect is equivalent to moving the sampling point corresponding to the basic delay value to the leading edge of the data, while the delay value used to delay the data strobe signal DQS is not adjusted.

Figure 6:
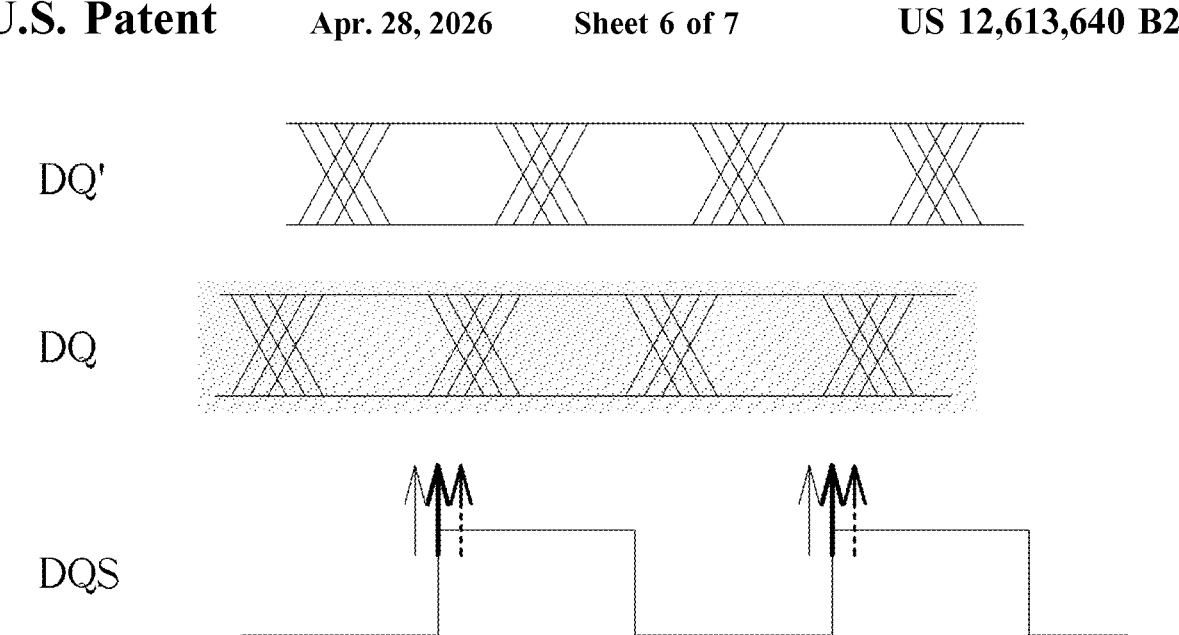
FIG. 6 is diagram illustrating feedback control of the state S01 shown in FIG. 5 according to an embodiment of the present invention.

FIG. 6 is a diagram illustrating feedback control of the state S01 shown in FIG. 5 according to an embodiment of the present invention, wherein waveforms of the data signal DQ, the delayed data signal DQ', and the data strobe signal DQS are illustrated in FIG. 6, the waveform of the data signal DQ is additionally covered by the bottom of the net, and the delayed data signal DQ' is not covered by the bottom of the net, which represents the operations of switching the target data signal (i.e. the signal source of the sampling operations) from the data signal DQ to the delayed data signal DQ'.

In state S02, when the delayed data signal DQ' is provided as the target data signal (i.e. the data signal source of the sampling circuits is switched to a data signal providing path with delay by the MUXs), and the third sampling value (e.g. the sampling value post_Data) is different from the first sampling value (e.g. the sampling value pre_Data) and the second sampling value (e.g. the sampling value cen_Data), the delay control circuits 220-1 and 220-2 may synchronously decrease the first delay value, the second delay value, and the third delay value. It should be noted that, since the delayed data signal DQ' acts as the signal source of the sampling operations in the state S02, and the sampling results indicate the sampling point (or the central sampling phase) corresponding to the current basic delay value is too close to the trailing edge of the data, the feedback control implemented in the state S02 changes (e.g. decreases) the delay value used to delay the data strobe signal DQS, so that the sampling points corresponding to the basic delay value, the leading delay value, and the trailing delay value can move to the leading edge of the data, and the target data signal is not adjusted.

In state S03, when the delayed data signal DQ' is provided as the target data signal (i.e. the data signal source of the sampling circuits is switched to the data signal providing path with delay by the MUXs), and the first sampling value (e.g. the sampling value pre_Data) is different from the second sampling value (e.g. the sampling value cen_Data) and the third sampling value (e.g. the sampling value post_Data), it is determined to provide the data signal DQ to the sampling circuits 250-1 and 250-2 as the target data signal. It should be noted that, when the first sampling value is different from the second sampling value and the third sampling value, it means that the sampling point (or the central sampling phase) corresponding to the current basic delay value is too close to the leading edge of the data. The feedback control implemented in the state S03 is used to change the target data signal. Its effect is equivalent to moving the sampling point corresponding to the basic delay value to the trailing edge of the data, while the delay value used to delay the data strobe signal DQS is not adjusted.

Figure 7:
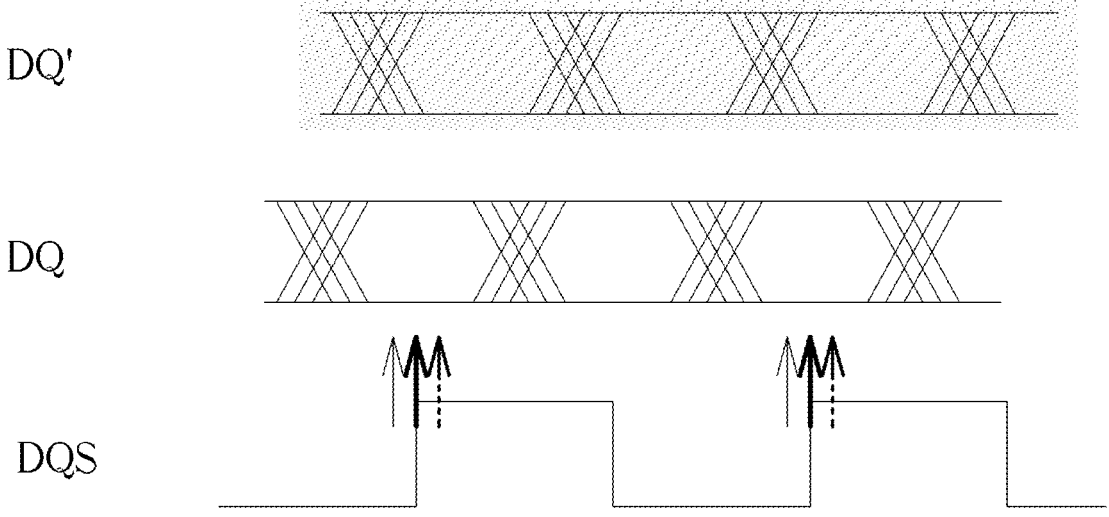
FIG. 7 is a diagram illustrating feedback control of the state S03 shown in FIG. 5 according to an embodiment of the present invention.

FIG. 7 is a diagram illustrating feedback control of the state S03 shown in FIG. 5 according to an embodiment of the present invention, wherein waveforms of the data signal DQ, the delayed data signal DQ', and the data strobe signal DQS are illustrated in FIG. 7, the waveform of the delayed data signal DQ' is additionally covered by the bottom of the net, and the data signal DQ is not covered by the bottom of the net, which represents the operations of switching the target data signal (i.e. the signal source of the sampling operations) from the delayed data signal DQ' to the data signal DQ.

In state S04, when the data signal DQ is provided as the target data signal (i.e. the data signal source of the sampling circuits is switched to the data signal providing path with no delay by the MUXs), and the first sampling value (e.g. the sampling value pre_Data) is different from the second sampling value (e.g. the sampling value cen_Data) and the third sampling value (e.g. the sampling value post_Data), the delay control circuits 220-1 and 220-2 may synchronously increase the first delay value, the second delay value, and the third delay value. It should be noted that, since the data signal DQ acts as the signal source of the sampling operations in the state S04, and the sampling results indicate the sampling point (or the central sampling phase) corresponding to the current basic delay value is too close to the leading edge of the data, the feedback control implemented in the state S04 changes the delay value used to delay the data strobe signal DQS, so that the sampling points corresponding to the basic delay value, the leading delay value, and the trailing delay value can move to the trailing edge of the data, and the target data signal is not adjusted.

Figure 8:
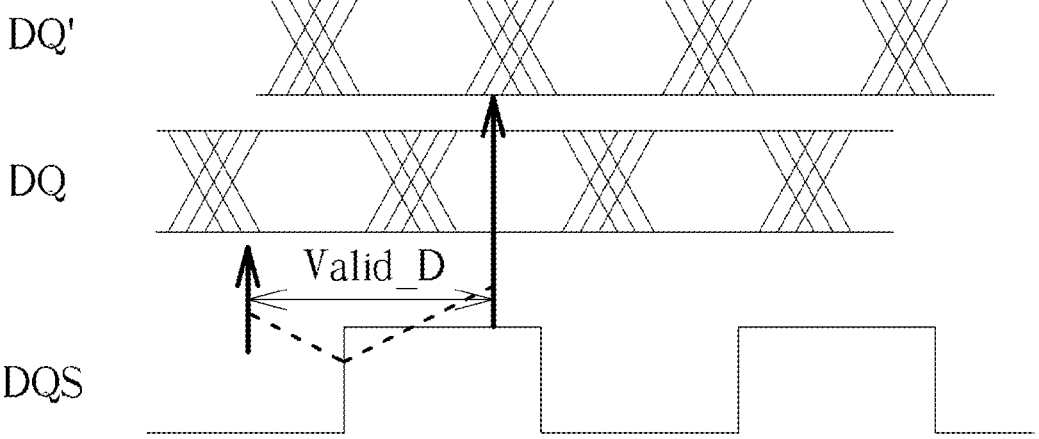
FIG. 8 is a diagram illustrating an effective sampling window according to an embodiment of the present invention.

FIG. 8 is a diagram illustrating an effective sampling window according to an embodiment of the present invention. In this embodiment, by delaying the data signal DQ and dynamically and flexibly switching the signal source of the sampling operations between the data signal DQ and the delayed data signal DQ' according to the current sampling results, the effective sampling window can be expanded. As shown in FIG. 8, an effective sampling window Valid_D (e.g. an effective sampling range) obtained by the memory data receiving method of the present invention is a union of an effective sampling range of the data signal DQ and an effective sampling range of the delayed data signal DQ'. As a result, an effective sampling range of the data can be expanded automatically, the sampling error rate can be reduced effectively, and the data reception stability and the noise immunity of the memory device system can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller, arranged to access a memory device, the memory controller comprising:

a receiving circuit, arranged to receive a data signal and a data strobe signal from the memory device, the receiving circuit comprising:

a sampling circuit, arranged to sample the data signal or a delayed data signal according to a plurality of delayed versions of the data strobe signal, in order to generate a plurality of sampling values, wherein the delayed data signal is a delayed version of the data signal; and a comparison circuit, arranged to compare the plurality of sampling values to obtain a comparison result, and arranged to determine to provide the data signal or the delayed data signal to the sampling circuit according to the comparison result;

wherein the plurality of delayed versions of the data strobe signal comprise a first delayed data strobe signal generated according to a first delay value, a second delayed data strobe signal generated according to a second delay value, and a third delayed data strobe signal generated according to a third delay value; the sampling circuit samples the data signal or the delayed data signal according to the first delayed data strobe signal, the second delayed data strobe signal, and the third delayed data strobe signal in sequence, to generate a first sampling value, a second sampling value, and a third sampling value, respectively; and the first delay value is smaller than the second delay value, and the second delay value is smaller than the third delay value.

2. The memory controller of claim 1, wherein when the data signal is provided to the sampling circuit and the third sampling value is different from the first sampling value and the second sampling value, the comparison circuit determines to provide the delayed data signal to the sampling circuit.

3. The memory controller of claim 1, wherein when the delayed data signal is provided to the sampling circuit and the first sampling value is different from the second sampling value and the third sampling value, the comparison circuit determines to provide the data signal to the sampling circuit.

4. The memory controller of claim 1, wherein the receiving circuit further comprises a delay control circuit, the delay control circuit is arranged to control the first delay value, the second delay value, and the third delay value according to the comparison result; and when the delayed data signal is provided to the sampling circuit, and the third sampling value is different from the first sampling value and the second sampling value, the delay control circuit decreases the first delay value, the second delay value, and the third delay value.

5. The memory controller of claim 4, wherein when the data signal is provided to the sampling circuit and the first sampling value is different from the second sampling value and the third sampling value, the delay control circuit increases the first delay value, the second delay value, and the third delay value.

6. The memory controller of claim 1, wherein the sampling circuit samples the data signal or the delayed data signal according to a first edge of the first delayed data strobe signal to generate the first sampling value, samples the data signal or the delayed data signal according to a second edge of the second delayed data strobe signal to generate the second sampling value, and samples the data signal or the delayed data signal according to a third edge of the third delayed data strobe signal to generate the third sampling value.

7. The memory controller of claim 6, wherein the first edge is an edge closest to one side of the second edge in all edges of the first delayed data strobe signal, and the third edge is an edge closest to another side of the second edge in all edges of the third delayed data strobe signal.

8. A memory data receiving method, comprising the following steps:

(A) receiving a data signal and a data strobe signal from a memory device;

(B) generating a delayed data signal according to a predetermined delay value;

(C) selecting the data signal or the delayed data signal as a target data signal, and sampling the target data signal according to a plurality of delayed versions of the data strobe signal to generate a plurality of sampling values; and (D) comparing the plurality of sampling values to obtain a comparison result, and determining to provide the data signal or the delayed data signal as the target data signal according to the comparison result;

wherein the step (C) further comprises:

(C-1) generating a first delayed data strobe signal according to a first delay value;

(C-2) generating a second delayed data strobe signal according to a second delay value;

(C-3) generating a third delayed data strobe signal according to a third delay value; and (C-4) sampling the target data signal according to the first delayed data strobe signal, the second delayed data strobe signal, and the third delayed data strobe signal in sequence, to generate a first sampling value, a second sampling value, and a third sampling value, respectively;

wherein the first delay value is smaller than the second delay value, and the second delay value is smaller than the third delay value.

9. The memory data receiving method of claim 8, wherein in response to the data signal being provided as the target data signal and the third sampling value being different from the first sampling value and the second sampling value, determining to provide the delayed data signal as the target data signal in the step (D).

10. The memory data receiving method of claim 8, wherein in response to the delayed data signal being provided as the target data signal and the first sampling value being different from the second sampling value and the third sampling value, determining to provide the data signal as the target data signal in the step (D).

11. The memory data receiving method of claim 8, further comprising:

(E) adjusting the first delay value, the second delay value, and the third delay value according to the comparison result, wherein in response to the delayed data signal being provided as the target data signal, and the third sampling value being different from the first sampling value and the second sampling value, the first delay value, the second delay value, and the third delay value are decreased.

12. The memory data receiving method of claim 11, wherein in response to the data signal being provided as the target data signal, and the first sampling value being different from the second sampling value and the third sampling value, the first delay value, the second delay value, and the third delay value are increased.

13. The memory data receiving method of claim 8, wherein in the step (C-4), the target data signal is sampled according to a first edge of the first delayed data strobe signal, a second edge of the second delayed data strobe signal, and a third edge of the third data strobe signal, respectively.

14. The memory data receiving method of claim 13, wherein the first edge is an edge closest to one side of the second edge in all edges of the first delayed data strobe signal, and the third edge is an edge closest to another side of the second edge in all edges of the third delayed data strobe signal.

* * * * *